US008518568B2

(12) United States Patent  (10) Patent No.: US 8,518,568 B2
Dougherty et al.  (45) Date of Patent: Aug. 27, 2013

(54) BATTERY SYSTEM

(75) Inventors: Thomas J. Dougherty, Waukesha, WI (US); Steven J. Wood, Shorewood, WI (US); Dale B. Trester, Milwaukee, WI (US); Michael G. Andrew, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 980 days.

(21) Appl. No.: 11/898,634

(22) Filed: Sep. 13, 2007

(65) Prior Publication Data
US 2008/0220315 A1  Sep. 11, 2008

Related U.S. Application Data

(63) Continuation of application No. PCT/US2005/030244, filed on Aug. 25, 2005.

(60) Provisional application No. 60/661,577, filed on Mar. 14, 2005, provisional application No. 60/666,533, filed on Mar. 30, 2005, provisional application No. 60/666,678, filed on Mar. 30, 2005.

(51) Int. Cl.
*H01M 2/12* (2006.01)
*H01M 2/36* (2006.01)
*H01M 6/08* (2006.01)

(52) U.S. Cl.
USPC ............... 429/71; 429/72; 429/82; 429/83; 429/164

(58) Field of Classification Search
None
See application file for complete search history.

(56) References Cited

U.S. PATENT DOCUMENTS

| 4,207,387 | A |   | 6/1980  | Jutte |
| 4,349,613 | A |   | 9/1982  | Winsel |
| 4,418,127 | A |   | 11/1983 | Shambaugh et al. |
| 4,528,248 | A |   | 7/1985  | Galbraith |
| 5,004,129 | A |   | 4/1991  | Loch et al. |
| 5,140,744 | A | * | 8/1992  | Miller ............................. 29/730 |
| 5,432,026 | A | * | 7/1995  | Sahm et al. ................... 429/120 |
| 5,585,204 | A | * | 12/1996 | Oshida et al. ................... 429/62 |
| 5,800,942 | A | * | 9/1998  | Hamada et al. ............... 429/148 |
| 5,916,704 | A |   | 6/1999  | Lewin et al. |
| 6,132,900 | A |   | 10/2000 | Yoshizawa et al. |
| 6,274,262 | B1 |  | 8/2001  | Canfield |
| 6,274,264 | B1 |  | 8/2001  | Azema |
| 6,337,154 | B1 |  | 1/2002  | Jacobs et al. |
| 6,392,172 | B1 |  | 5/2002  | Azema |

(Continued)

FOREIGN PATENT DOCUMENTS

DE  32 24 161 A1  12/1983
EP  0771037  5/1997

(Continued)

OTHER PUBLICATIONS

Machine translation of JP 10-255859 retrieved from <http://www19.ipdl.inpit.go.jp/PA1/cgi-bin/PA1INDEX> on Jun. 25, 2011.*

(Continued)

*Primary Examiner* — Cynthia Walls
(74) *Attorney, Agent, or Firm* — Fletcher Yoder PC

(57) ABSTRACT

A battery module includes a plurality of battery cells and a system configured for passing a fluid past at least a portion of the plurality of battery cells in a parallel manner.

21 Claims, 18 Drawing Sheets

(56) References Cited

U.S. PATENT DOCUMENTS

| | | |
|---|---|---|
| 6,399,238 B1 | 6/2002 | Oweis et al. |
| 6,403,250 B1 | 6/2002 | Azema et al. |
| 6,479,185 B1 | 11/2002 | Hilderbrand et al. |
| 6,479,294 B1 | 11/2002 | Fong et al. |
| 6,586,131 B2 | 7/2003 | Hallifaz et al. |
| 6,730,430 B2 | 5/2004 | Chang |
| 6,737,188 B2 | 5/2004 | Stec |
| 6,761,996 B1 | 7/2004 | Kim et al. |
| 7,189,473 B2 * | 3/2007 | Smith et al. ............ 429/82 |
| 2002/0102454 A1 | 8/2002 | Zhou et al. |
| 2004/0121195 A1 | 6/2004 | Ghantous et al. |
| 2004/0197659 A1 | 10/2004 | Kumar et al. |
| 2005/0007068 A1 | 1/2005 | Johnson et al. |
| 2005/0174092 A1 | 8/2005 | Dougherty |
| 2006/0093901 A1 * | 5/2006 | Lee et al. ............ 429/120 |

FOREIGN PATENT DOCUMENTS

| | | |
|---|---|---|
| EP | 1030388 | 8/2000 |
| EP | 0771037 | 5/2001 |
| EP | 1143541 | 10/2001 |
| JP | 59-154741 | 9/1984 |
| JP | 59-154742 | 9/1984 |
| JP | 59-154743 | 9/1984 |
| JP | 59-154744 | 9/1984 |
| JP | 56154741 | 9/1984 |
| JP | 59154742 | 9/1984 |
| JP | 59154743 | 9/1984 |
| JP | 59154744 | 9/1984 |
| JP | 10-255859 * | 9/1998 |
| WO | WO2007/001345 | 1/2007 |

OTHER PUBLICATIONS

Response to Office Action for European Application No. 05858083.8, dated Jan. 25, 2010, 14 pages.

International Search Report and Written Opinion for International Application No. PCT/US2005/030244, mailing date Dec. 21, 2006; 9 pages.

Office Action for Foreign Application No. 05 858 083.8-1227, dated Jul. 17, 2009, 3 pages.

International Preliminary Report on Patentability for International Application No. PCT/US2005/030244, Issue date Sep. 18, 2007, 6 pages.

International Search Report for International Application No. PCT/US2005/030244, mailing date Dec. 21, 2006, 4 pages.

Written Opinion of the International Searching Authority for International Application No. PCT/US2005/030244, mailing date Dec. 21, 2006, 5 pages.

Communication for European Application No. 05 858 083.8-1227; received Nov. 8, 2011; 5 pages.

* cited by examiner

BATTERY SYSTEM

CROSS-REFERENCE TO RELATED PATENT APPLICATIONS

The present application is a continuation of International Application No. PCT/US2005/030244, filed Aug. 25, 2005, which claims the benefit of U.S. Provisional Patent Application No. 60/661,577, filed Mar. 14, 2005; U.S. Provisional Patent Application No. 60/666,533, filed Mar. 30, 2005; and U.S. Provisional Patent Application No. 60/666,678, filed Mar. 30, 2005. The aforementioned applications are incorporated by reference herein in their entireties.

STATEMENT REGARDING FEDERALLY SPONSORED RESEARCH OR DEVELOPMENT

The government of the United States has rights in this invention pursuant to Contract No. DE-FC26-95EE50425 awarded by the U.S. Department of Energy.

BACKGROUND

The present application relate to batteries and battery systems. More specifically, the present inventions relate to lithium batteries (e.g., lithium-ion batteries, lithium-polymer batteries, etc.) and systems using such batteries.

It is known to provide batteries for use in vehicles such as automobiles. For example, lead-acid batteries have been used in starting, lighting, and ignition applications. More recently, hybrid vehicles have been produced which utilize a battery (e.g., a nickel-metal-hydride battery) in combination with other systems (e.g., an internal combustion engine) to provide power for the vehicle.

It is generally known that lithium batteries perform differently than nickel-metal-hydride batteries. In some applications, it may be desirable to obtain the enhanced power/performance of a lithium battery. For example, lithium batteries may provide greater specific power than nickel-metal-hydride batteries. However, the application of lithium battery technology may present design and engineering challenges beyond those typically presented in the application of conventional nickel-metal-hydride battery technology.

The design and management of a battery system that can be advantageously utilized in a hybrid vehicle may involve considerations such as electrical performance monitoring, thermal management, and containment of effluent (e.g., gases that may be vented from a battery cell).

SUMMARY

The present invention relates to a lithium battery module that includes a plurality of lithium battery cells and a system configured for passing a fluid past at least a portion of the plurality of lithium battery cells in a parallel manner.

DETAILED DESCRIPTION OF EXEMPLARY EMBODIMENTS

According to an exemplary embodiment, a lithium battery or cell (e.g., a lithium-ion cell, a lithium-polymer cell, etc.) is provided. It should be noted that while particular exemplary embodiments are shown and described in the present application, features described herein may be utilized with lithium batteries or cells of any presently known configuration or other configuration that may be developed in the future.

One or more lithium batteries or cells such as those described herein may be provided in an assembly or module comprising a plurality of such batteries according to an exemplary embodiment. Further, according to an exemplary embodiment in which a module including a plurality of lithium batteries is provided, the module may be included in a system that includes a plurality of lithium battery modules of any presently known configuration or any other configuration that may be developed in the future.

Various nonexclusive exemplary embodiments of lithium batteries and lithium battery systems are shown and described in U.S. patent application Ser. No. 10/976,169, filed Oct. 28, 2004, the entire disclosure of which is hereby incorporated by reference. The batteries, modules, and other features described herein may be used in conjunction with features disclosed in U.S. patent application Ser. No. 10/976,169, as will be appreciated by those of skill in the art reviewing this disclosure.

While FIGS. 1-20 illustrate particular exemplary embodiments of lithium batteries and battery systems, any of a variety of lithium batteries or battery systems may be used according to various other exemplary embodiments. For example, according to various exemplary embodiments, the physical configuration of the individual cells and/or the modules may be varied according to design objectives and considerations. According to one exemplary embodiment, a system may include a module having twelve cells (see, e.g., FIG. 5). According to other exemplary embodiments, a different number of cells may be included in a module.

Figure 1:
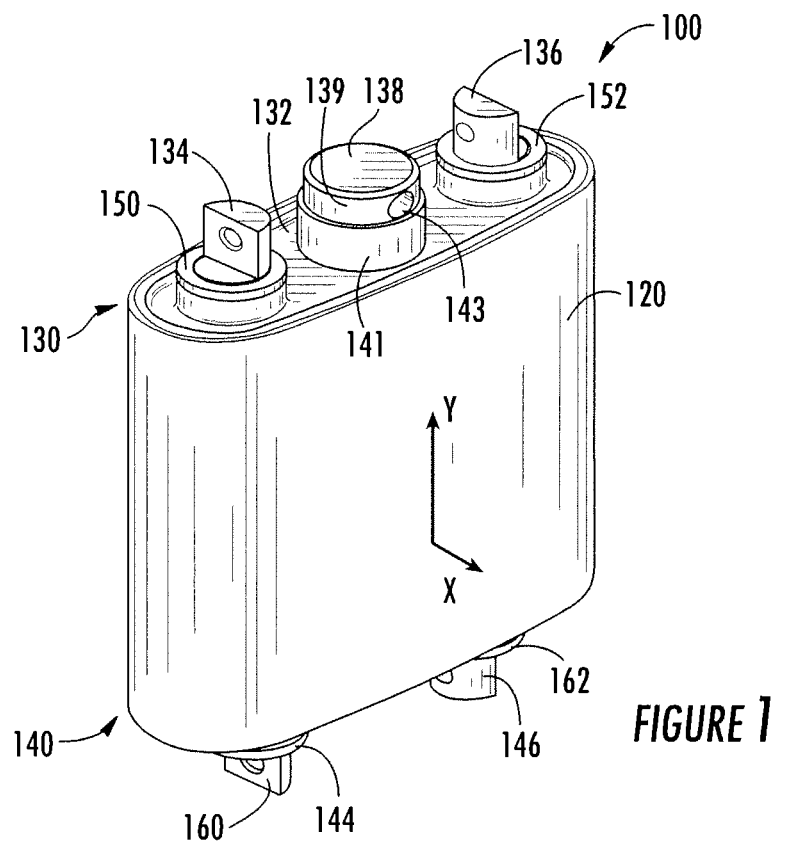
FIG. 1 is a perspective view of a lithium battery or cell according to an exemplary embodiment.

As shown in FIG. 1, a battery or cell 100 (e.g., a lithium-ion cell) is shown according to an exemplary embodiment. According to an exemplary embodiment, cell 100 is a lithium-ion cell having a fully charged voltage of between approximately 0 and 5 volts.

Figure 5:
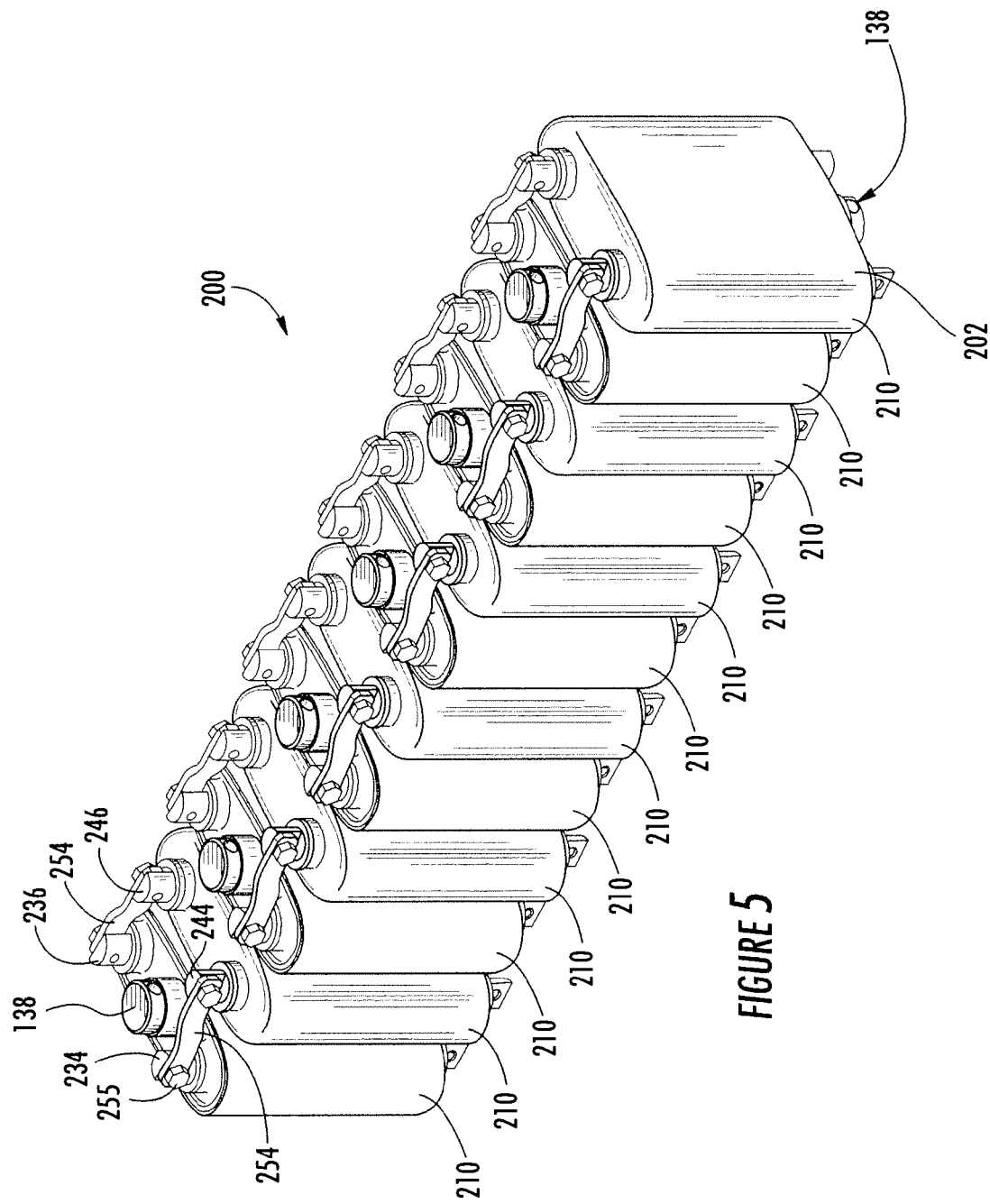
FIG. 5 is a perspective view of an assembly or module utilizing a plurality of batteries such as that shown in FIG. 1 according to an exemplary embodiment.

According to an exemplary embodiment, cell 100 includes a container 120 (e.g., as may be provided in the form of a canister, housing, casing, holder, etc.), a cover 132 (which may be referred to and/or be provided in the form of, for example, an end cover, collar, cap, top portion, end portion, etc.) provided at a first end 130 of cell 100 which may act to seal the cells. As shown in FIG. 5, according to an exemplary embodiment, a cover is not provided at a second end of the cell (although according to other exemplary embodiments, a cover such as cover 132 may be provided at second end 140 of cell 100).

According to various exemplary embodiments, cover 132 may be made from any suitable material (e.g., metals, plastics, composites, etc.). According to a particular exemplary embodiment, cover 132 could be made from a suitable plastic or a polymeric material such as polypropylene or Noryl™ commercially available from GE Plastics of Pittsfield, Mass.

According to an exemplary embodiment shown in FIG. 1, cell 100 includes one or more vents (shown, e.g., as vent 138) configured for allowing effluent (e.g., gas, liquid, and/or other materials) to escape (e.g., to be exhausted or expressed from) the interior of cell 100. Vent 138 is shown as being provided such that it extends from cover 132.

According to an exemplary embodiment, vent 138 is a valve such as a relief or burst valve to permit effluent to escape cell 100. As shown in FIG. 1, vent 138 comprises a member or element 139 that is received within a sleeve or rim 141. An aperture 143 provided in element 139 is in fluid communication with the interior of cell 100. When element 139 is in its normal operating mode, aperture 143 is blocked by rim 141 (i.e., element 139 slides down into rim 141). In the event that effluent builds up to a predetermined threshold, element 139 will move upward to expose aperture 143 such that effluent may escape cell 100. According to an exemplary embodiment, vent 138 may be configured to allow gas and/or other materials to escape from the cell when the pressure within the cell reaches a particular threshold (e.g., a high pressure threshold of between approximately 3 psi and 30 psi).

Vent 138 (or other structures utilized to perform a similar function) may be configured to allow venting of effluent from within cell 100 to a path or passage such as a channel or other structure provided within a battery module to allow removal of effluent or other materials to a location away from the cells and/or the module in which such cells are provided. According to other exemplary embodiments, vent 138 may be coupled to tubes, hoses, or other structures configured to allow the removal of effluent to a location away from the cells and/or a module in which such cells are provided.

Vents may be provided in one or both ends of the cells according to various exemplary embodiments. For example, as shown in FIG. 5 according to one exemplary embodiment, vents 138 are provided at only one end of the cells. According to another exemplary embodiment shown in FIG. 9, vents 138 are provided at both ends of the cells.

Two terminals or posts 134 and 136 extend from first end 130 of cell 100, and two terminals or posts 144 and 146 extend from second end 140 of cell 100. According to an exemplary embodiment, terminals 134 and 136 are positive terminals and terminals 144 and 146 are negative terminals for cell 100. It is intended that by having a plurality (e.g., two or more) of terminals in a terminal set for a cell, the cell would be provided with enhanced symmetric thermal conductivity (e.g., and possibly enhanced current distribution within the cell) in comparison with a cell having only a single positive terminal and a single negative terminal.

According to an exemplary embodiment, terminals 134, 136, 144, and 146 are configured such that positive terminals from a first cell may be electrically coupled to negative terminals of another cell. For example, according to an exemplary embodiment shown in FIG. 6 in which a system 300 includes a first cell 310 and a second cell 320, terminals 312 and 314 of cell 310 may be coupled to terminals 322 and 324 of cell 320, respectively, using fasteners 330 and 332 (e.g., bolts, screws, etc.) or some other fastening mechanism. Apertures or holes may be provided in the terminals to allow the fasteners to electrically couple the terminals together (as shown, for example, in FIG. 1).

Figure 6:
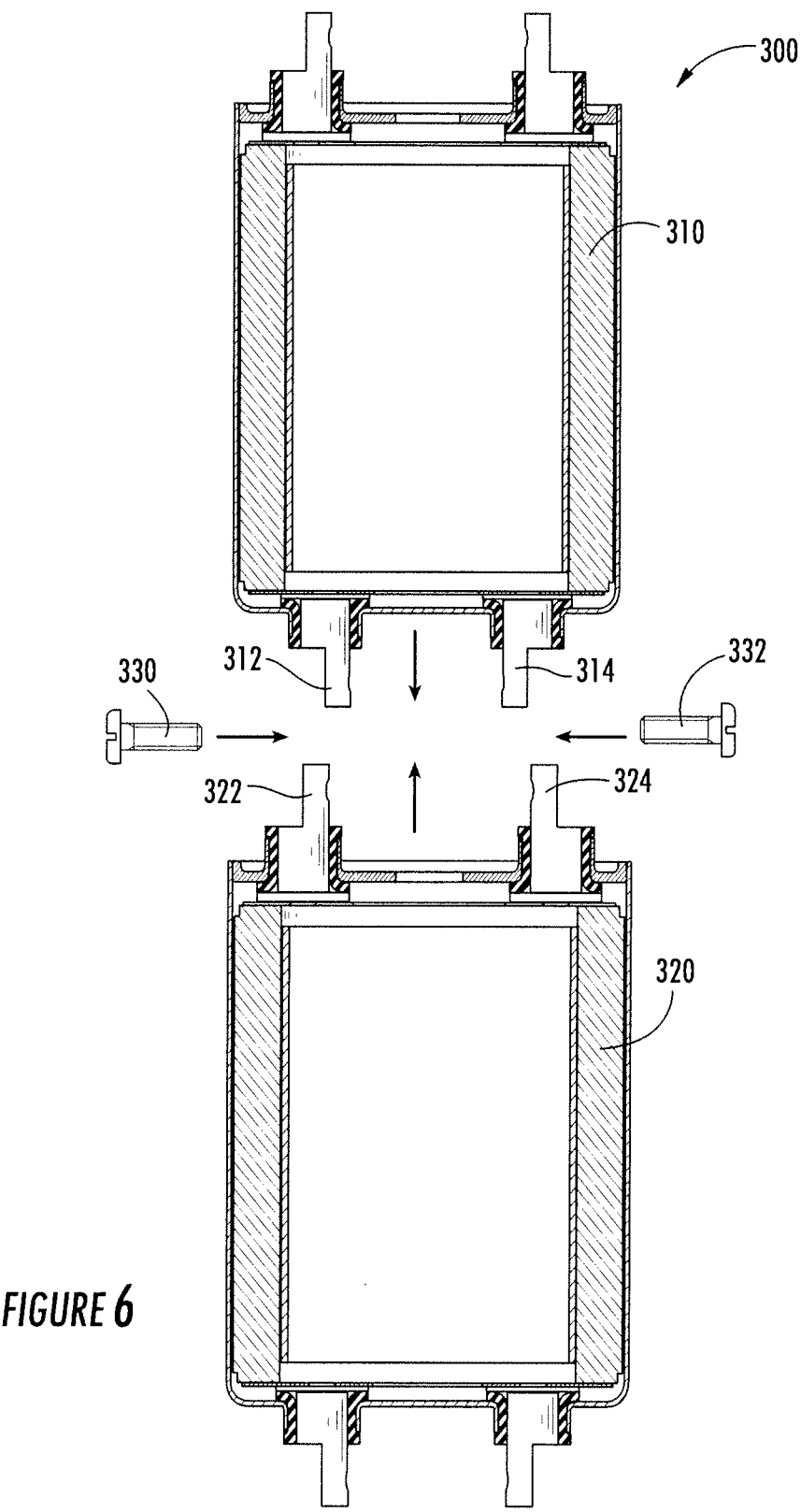
FIG. 6 illustrates the assembly of two lithium batteries or cells according to an exemplary embodiment.
Figure 7:
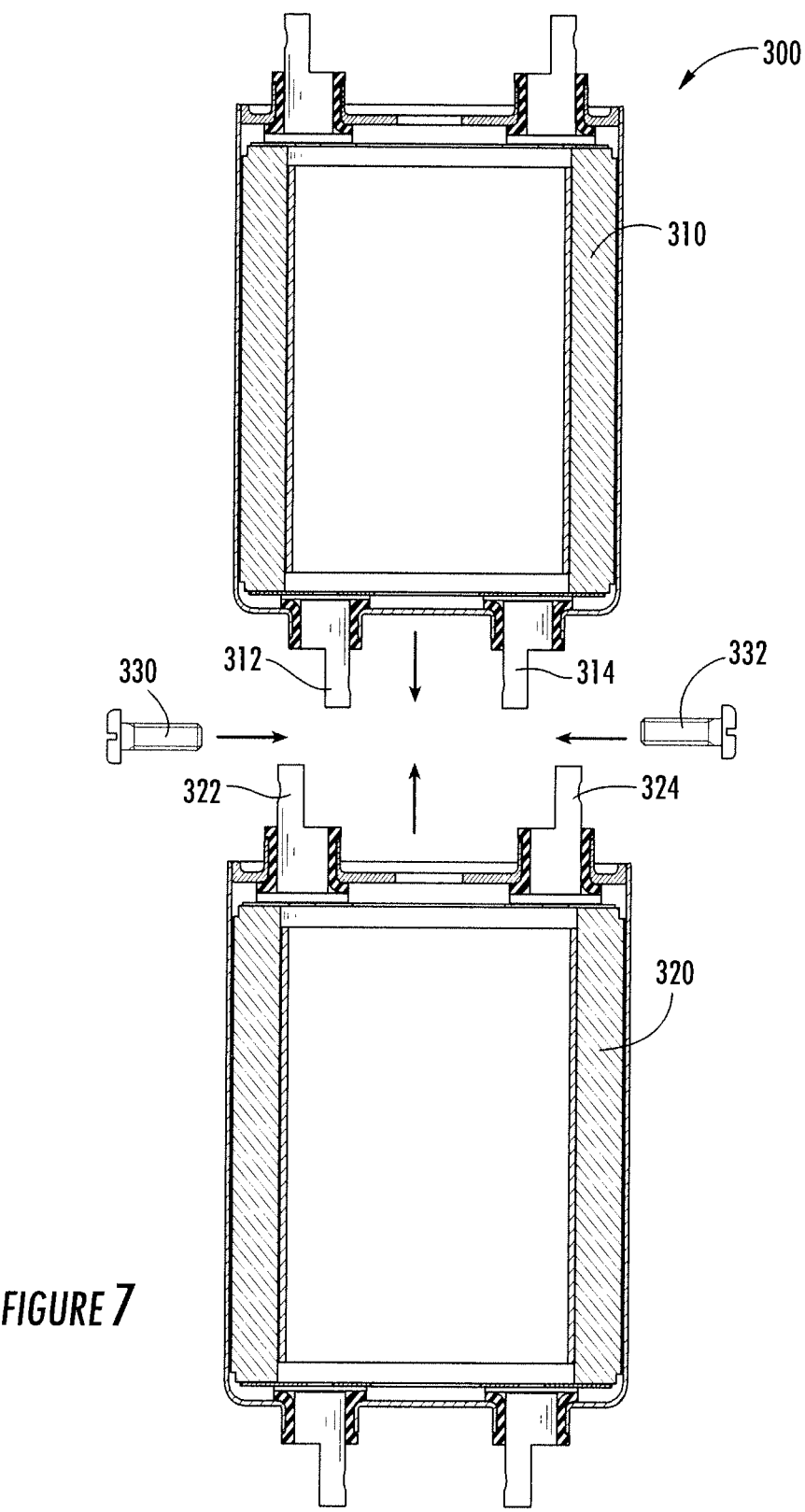
FIG. 7 illustrates the assembly of two lithium batteries or cells according to another exemplary embodiment.
Figure 8:
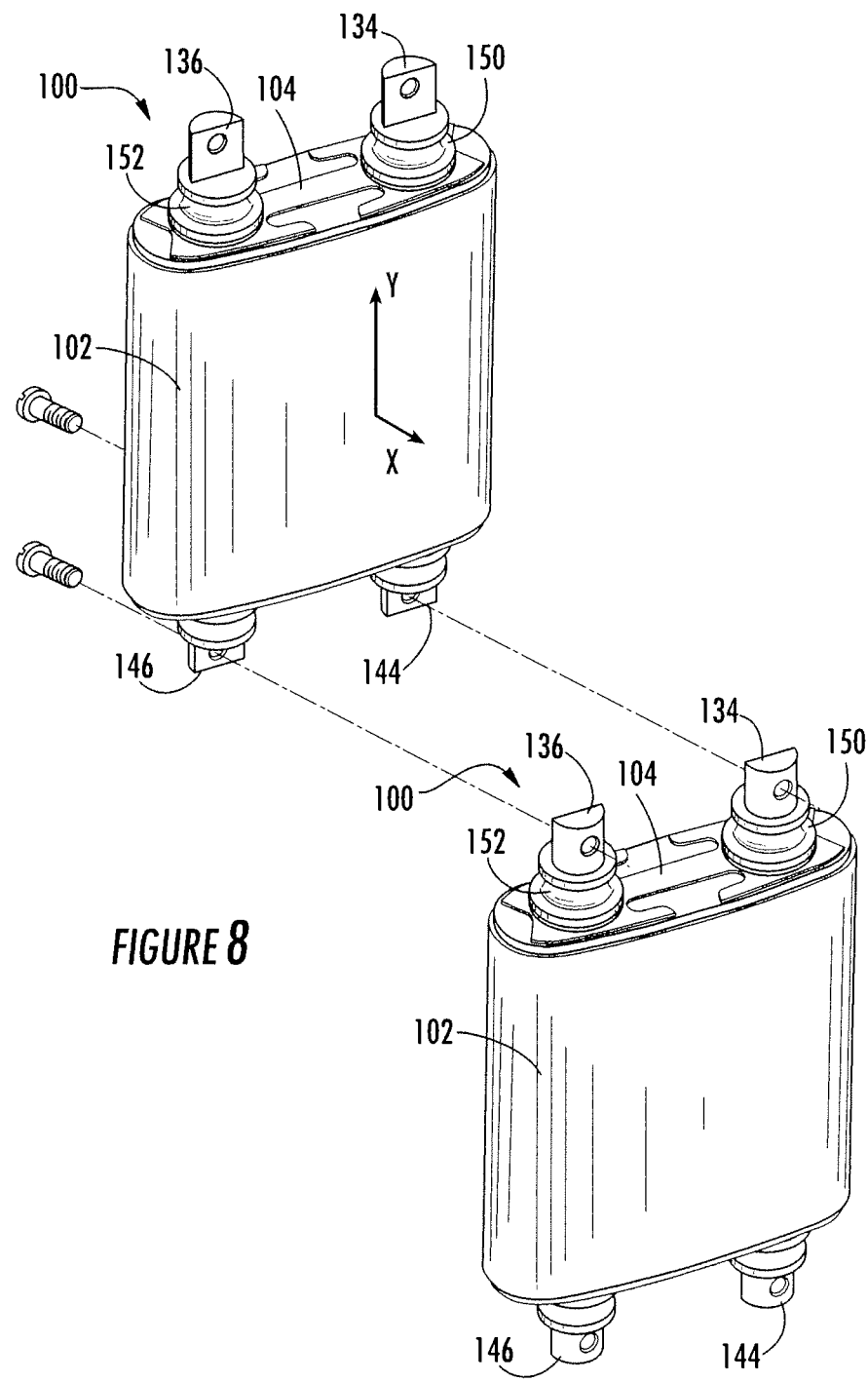
FIG. 8 illustrates the assembly of two lithium batteries or cells according to another exemplary embodiment.
Figure 9:
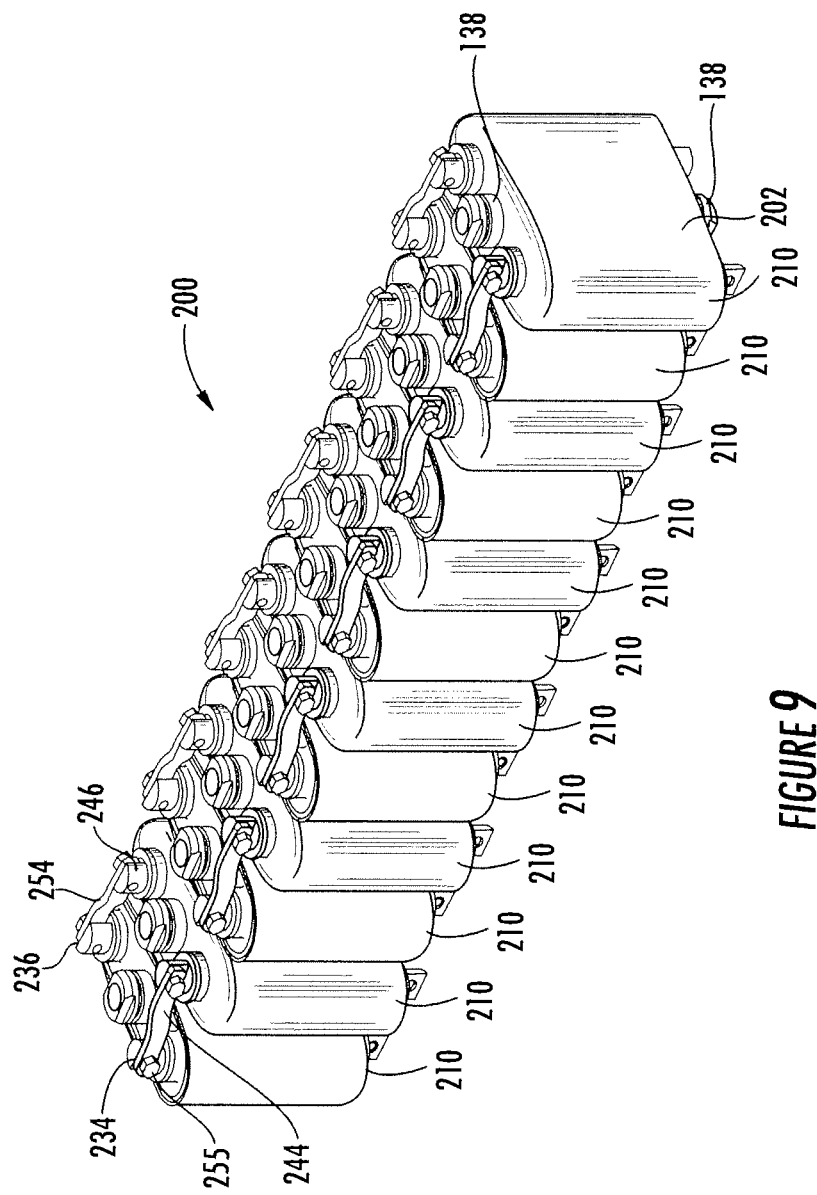
FIG. 9 is a perspective view of an assembly or module utilizing a plurality of batteries according to an exemplary embodiment.

As shown in FIG. 6, terminals 312 and 314 are offset with respect to terminals 322 and 324 to facilitate electrical coupling of the cells. In this manner, positive and negative cells may be coupled together in a relatively simple and efficient manner. While FIG. 6 illustrates the use of fasteners 330 and 332 and a particular configuration for the various terminals, it should be understood that other fasteners and/or terminal configurations may be used according to various other exemplary embodiments to facilitate electrical coupling of adjacent cells together. According to still other exemplary embodiments, the terminals shown in FIG. 1 may be rotated to any suitable position. For example, according to an exemplary embodiment shown in FIG. 7, terminals 322 and 324 of cell 320 are shown as being rotated with respect to those shown in FIG. 6 and spaced closer together to couple with terminals 312 and 314 of cell 310. According to another exemplary embodiment shown in FIG. 8, terminals 136 and 134 and terminals 146 and 144 are shown as being rotated 90 degrees so that the cells are fastened by a bolt or other fastener in the radial direction or "X" direction (as shown in FIG. 8). The configurations displayed in FIGS. 6-8 demonstrate that the battery cells may be constructed with terminals with a variety of orientations to facilitate convenient coupling.

The configuration of the positive and negative terminals may also act to provide an assurance that the cells will be installed within a module in a correct orientation (e.g., the distinct configurations for each set of terminals will not allow improper insertion of the cell within the module, which may include connectors or other features that are configured to engage either the positive or negative terminals).

According to an exemplary embodiment, terminals 134, 136, 144, and 146 are configured both to conduct electricity as part of the battery system and also to assist in removing heat from cell 100. It is believed that a relatively significant amount of heat may be removed from cell 100 through terminals 134, 136, 144, and 146, which are coupled or connected to the interior of cell 100. It has been found that a relatively large amount of heat flux may exist in the axial or "Y" direction (as shown in FIG. 1) as compared to that which exists in the radial or "X" direction for the cell.

According to an exemplary embodiment, terminals 134, 136, 144, and 146 are made from a conductive material such as a metal (e.g., aluminum, copper, nickel-plated steel, or other suitable alloys). When a fluid (e.g., a gas such as air, a liquid such as a silicone oil, a fluorosilicate oil, mineral oil or another suitable coolant that is relatively non-ionic and having a relatively high dielectric constant, either now known or developed in the future) is passed across the terminals that is at a lower temperature than the temperature of the terminals (which conduct heat from within cell 100), it is believed that heat may be removed in the fluid stream from the terminals, and hence, from within the cell. According to one exemplary embodiment, the terminals may be positioned within a space such as a channel (e.g., provided within a battery module) through which a fluid such as a gas or liquid may flow across the terminals to allow for cooling of the terminals. According to another exemplary embodiment, terminals (e.g., the positive terminals) may be welded to container 120 to allow the transfer of heat through the terminals.

Figure 4:
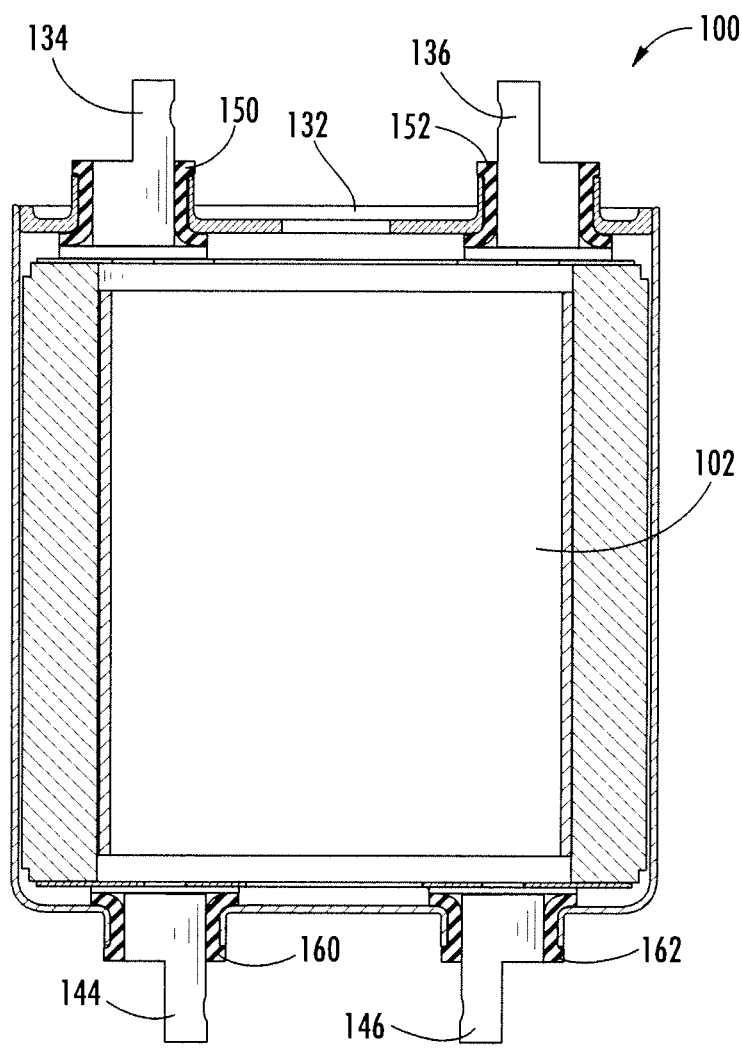
FIG. 4 is a cross-sectional view of the battery shown in FIG. 1 according to an exemplary embodiment.

According to an exemplary embodiment shown in FIGS. 1-4, cell 100 may include members or elements 150, 152, 160, and 162 in the form of bushings provided in contact with terminals 134, 136, 144, and 146. According to an exemplary embodiment, bushings 150, 152, 160, and 162 are made of a rubber or other polymeric material and are configured to allow for venting of gas from within cell 100 in the event that gas pressure builds up within the cell to a predetermined value (e.g., 20 bars). As shown in FIG. 4, terminals 134, 136, 144, and 146 are arranged such that they are slidably received within bushings 150, 152, 160, and 162. A pressure buildup within cell 100 may cause sliding movement between terminals 134, 136, 144, and 146 and bushings 150, 152, 160, and 162 such that effluent within the cell may escape.

According to an exemplary embodiment, the container is electrically insulated (e.g., isolated) from electrodes included within the container. For example, plastic (or other suitable insulating materials) may be placed in the container to provide adequate insulation between the container and the electrodes.

Container 120 may be made from any suitable material, such as a metal, a polymeric material, a composite material, etc. According to an exemplary embodiment, container 120 is made from aluminum or an aluminum alloy. According to another exemplary embodiment, container 120 is made from steel. According to various other exemplary embodiments, the container may be made from other metals, such as nickel, nickel alloys, titanium, titanium alloys, and/or other metals and metal alloys.

Container 120 may have any of a variety of shapes, sizes, and configurations. For example, the container may be octagonal, cylindrical, generally flattened-oval, octal-oval, prismatic, or any of a variety of other shapes. According to an exemplary embodiment, the cell has a symmetrical shape that optimizes performance and/or heat dissipation (e.g., provides a uniform temperature throughout the cell).

As shown in FIGS. 1 through 4, container 120 has a generally oval shape or profile according to an exemplary embodiment. One advantageous feature of providing container 120 with a generally oval shape is that the surface area of outer surface 122 of container 120 is greater than that of a comparable cylindrical-shaped container, which may allow for increased heat transfer from the cell through container 120. Another advantageous feature of providing a container having a generally oval shape is that the thickness or width of the container is smaller than a cylindrical cell (i.e., with the thickness or width corresponding to the smallest axis of the container).

Figure 2:
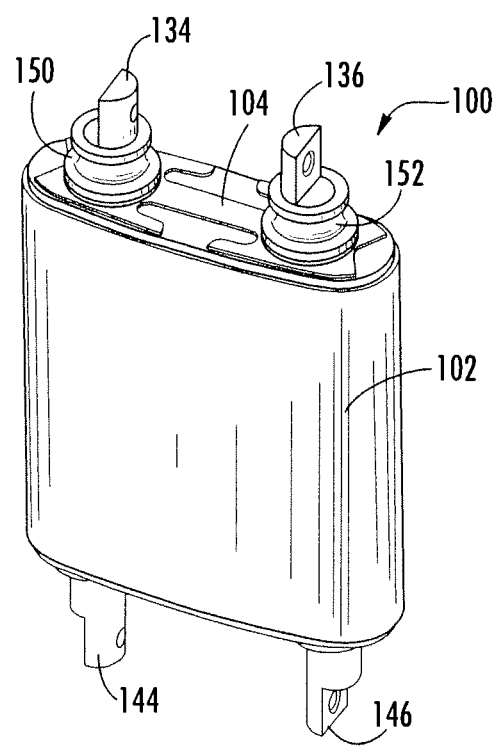
FIG. 2 is a perspective view of the battery shown in FIG. 1 having its outer housing or casing removed according to an exemplary embodiment.
Figure 3:
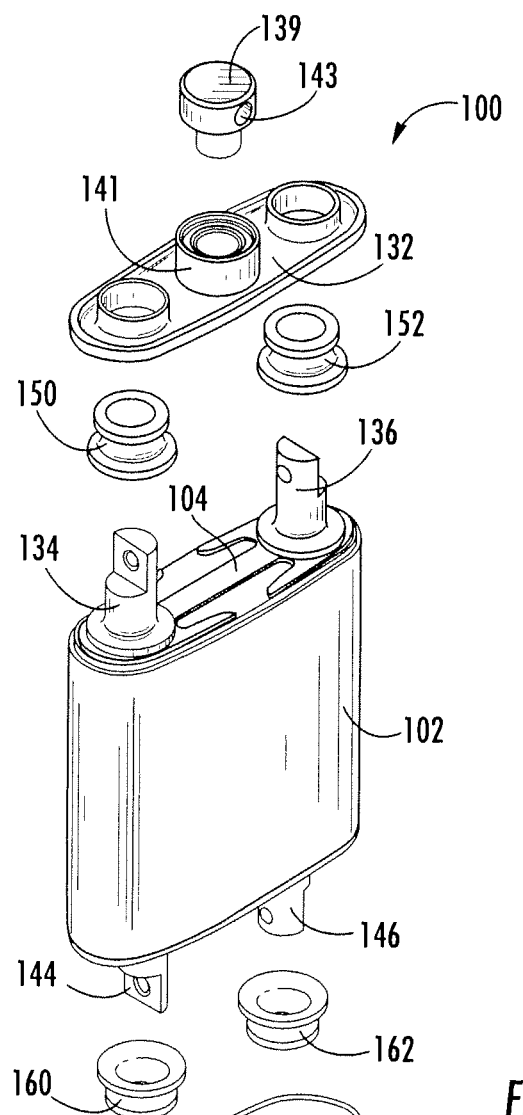
FIG. 3 is an exploded perspective view of the battery shown in FIG. 1 according to an exemplary embodiment.
Figure 3:
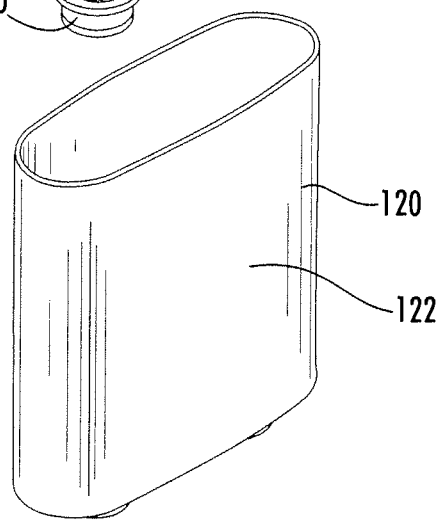

FIG. 2 illustrates cell 100 having its container 120 removed, with an element 102 (e.g., a wound spiral electrode set comprising at least one positive electrode, at least one negative electrode, and at least one separator provided intermediate the one or more positive and negative electrodes). The electrodes and the separators are wound or wrapped such that they have a generally oval or elliptical shape (or other shape, depending on the shape of the container used) to form a cell element.

One advantageous feature of element 102 is that it may be produced in a manner that allows for better winding speeds in manufacturing. Element 102 also advantageously includes a relatively tightly wound configuration, which may allow more efficient packaging of the element within a container.

An element 104 in the form of a strap is coupled to the one or more electrodes of a single polarity type (e.g., the positive electrode(s) as shown in FIG. 2) and to the associated terminals (e.g., terminals 134 and 136 as shown in FIG. 2) to couple the associated electrode(s) and terminals and to gather or collect current and/or heat from within cell 100. A similar element in the form of a strap may be provided on the opposite end of the battery to couple the electrode(s) of opposite polarity to their associated terminals.

One advantageous feature of the configuration shown, for example, in FIGS. 1-4 is that terminals may be connected to the battery electrodes or plates without the necessity to provide tabs on the electrodes. According to an exemplary embodiment, element 104 may be laser welded to the appropriate electrode(s). Both the terminals and the straps (e.g., element 104) may be configured such that current and heat conduction are optimized.

The size, shape, and configuration of element 104 may differ from that shown in FIG. 2 according to various other exemplary embodiments, and may be selected such that the current flow between the electrodes is optimized. For example, according to an exemplary embodiment, a cell may use an element (e.g., a strap) having a crescent shape such as the type described in U.S. Pat. No. 6,221,524 issued Apr. 24, 2001 entitled "Strap for Thin Metal Film Battery" or U.S. Pat. No. 6,051,336 issued Apr. 18, 2000 entitled "Battery Case for Thin Metal Film Cells," the entire disclosures of which are incorporated herein by reference. According to various exemplary embodiments, the straps may be coupled to the cell by welding (e.g., laser welding), soldering, heat fusing, spot welding, etc. (or any other suitable coupling method). The straps may be coupled to each end of the cell (e.g., each end of the wound roll of electrodes).

FIG. 5 illustrates a battery system 200 that includes a module or assembly 202 which includes a plurality of batteries or cells 210 electrically coupled together. Module 202 may be included in a module such as that shown in U.S. patent application Ser. No. 10/976,169 (e.g., having channels for airflow and effluent removal, etc.).

While the embodiment illustrated in FIG. 5 depicts a module 202 that includes 12 cells 210, the number of cells provided within a particular module may vary according to various exemplary embodiments (e.g., modules may include greater or less than 12 cells). Further, while system 200 is depicted as including a single module 202, it should be noted that battery systems may include any number of modules which include any number of batteries (e.g., three modules may be provided within a battery system, each of which may include any suitable number of cells). The particular configuration utilized for a battery system and/or module may be optimized to provide power for a particular application according to various exemplary embodiments. Module 202 may be included in a module such as that shown in U.S. patent application Ser. No. 10/976,169 (e.g., having channels for airflow and effluent removal, etc.).

As shown in FIG. 5, adjacent cells 210 are arranged in a manner such that they are inverted relative to each other. That is, negative terminals 234 and 236 of a first battery are provided adjacent positive terminals 244 and 246 of an immediately adjacent battery. In this manner, a positive terminal may be electrically connected or coupled to an adjacent negative terminal by a connector 254 (shown in the form of a buss bar secured to the terminals using fasteners 255). Adjacent cells 210 within module 202 are connected such that all cells 210 are connected in series.

According to an exemplary embodiment, a module (e.g., module 202) may be provided that has a voltage of between approximately 40 and 48 volts and that is rated at 12 amp hours and which includes 12 cells. The dimensions of such a module may be approximately 95 mm wide by 143 mm tall by 421 mm long, with a weight of approximately 7 kg. According to various other exemplary embodiments, the dimensions, ratings, or other characteristics may differ according to any of a variety of desired characteristics.

FIGS. 10-14 illustrate a battery module 400 having a manifold cooling system 410 configured to provide a cooling fluid (e.g., air) that passes over at least a portion (e.g., the terminals) of the cells of the module in parallel fashion. That is, the cooling fluid is routed such that it does not pass over all cells of the battery (which would accumulate heat as the air passed from one cell to the next), but rather, is instead routed such that it passes over only one or two of the cells. As shown in FIGS. 10-14, a manifold system is provided which routes air to two cells (twelve cells are shown, and six channels are provided such that each channel routes the fluid to two cells; for purposes of illustration, the airflow shown as lines 420, 452, and 453 follow the air flow path only with respect to one of the cells, although those of ordinary skill in the art reviewing this disclosure should understand that a manifold system may be provided that routes air or another fluid past any number of cells (e.g., two cells, three cells, etc.) in order to provide relatively efficient cooling for the cells. The module 400 utilizes generally cylindrical battery cells, although other types of cells such as those shown in FIG. 1 may also be utilized according to other exemplary embodiments.

Figure 10:
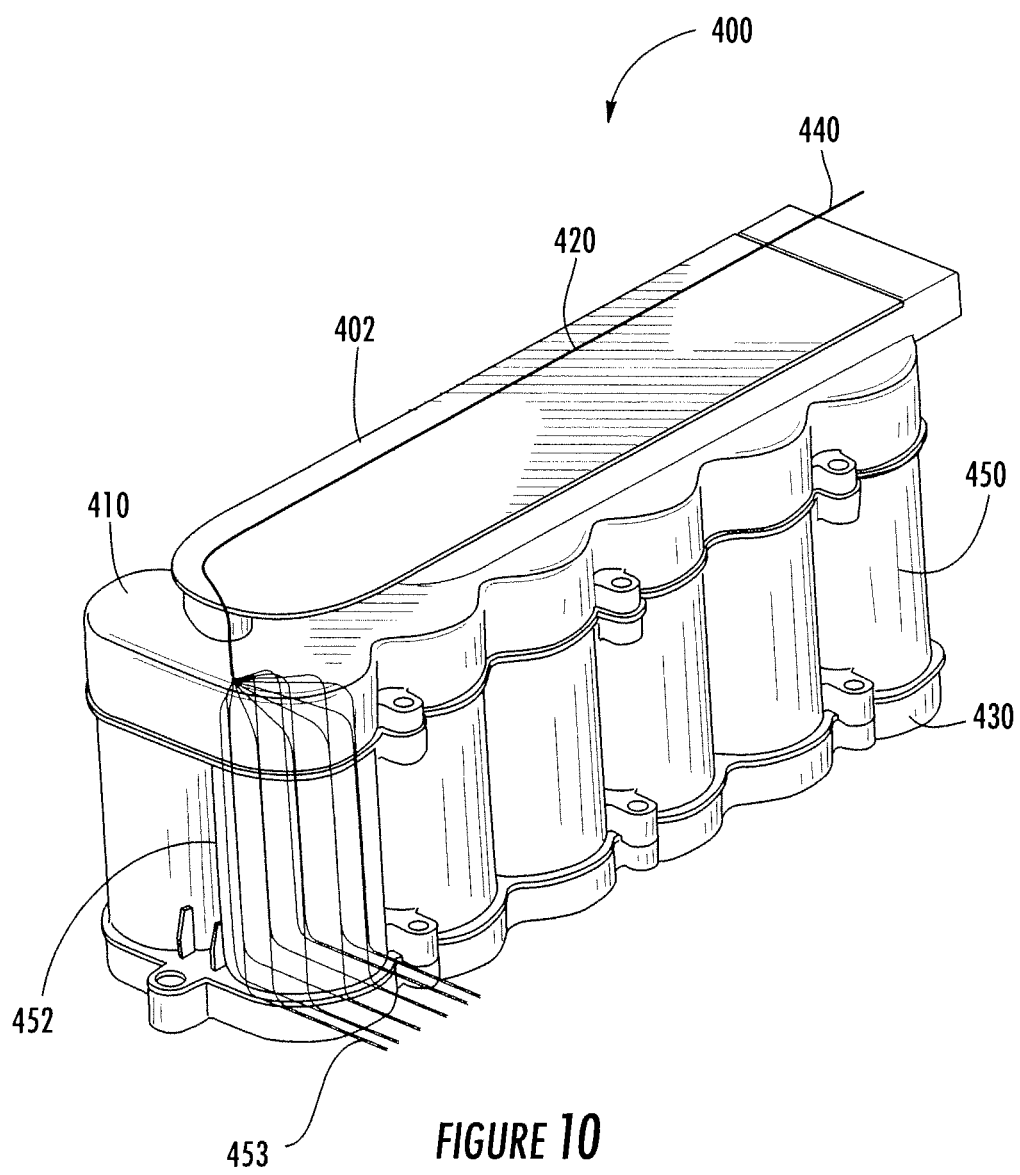
FIG. 10 is a perspective view of a battery system or module according to an exemplary embodiment.
Figure 11:
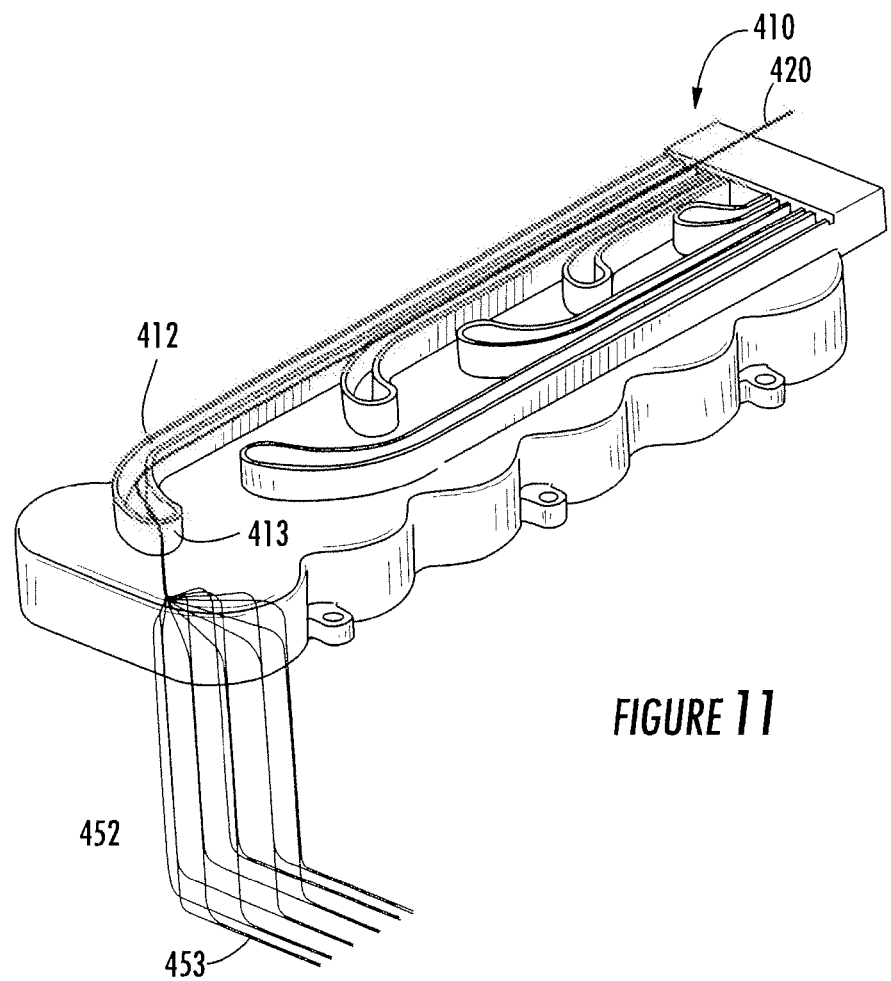
FIG. 11 is a perspective view of a manifold of the battery module shown in FIG. 10 showing a fluid flow path for the module.
Figure 12:
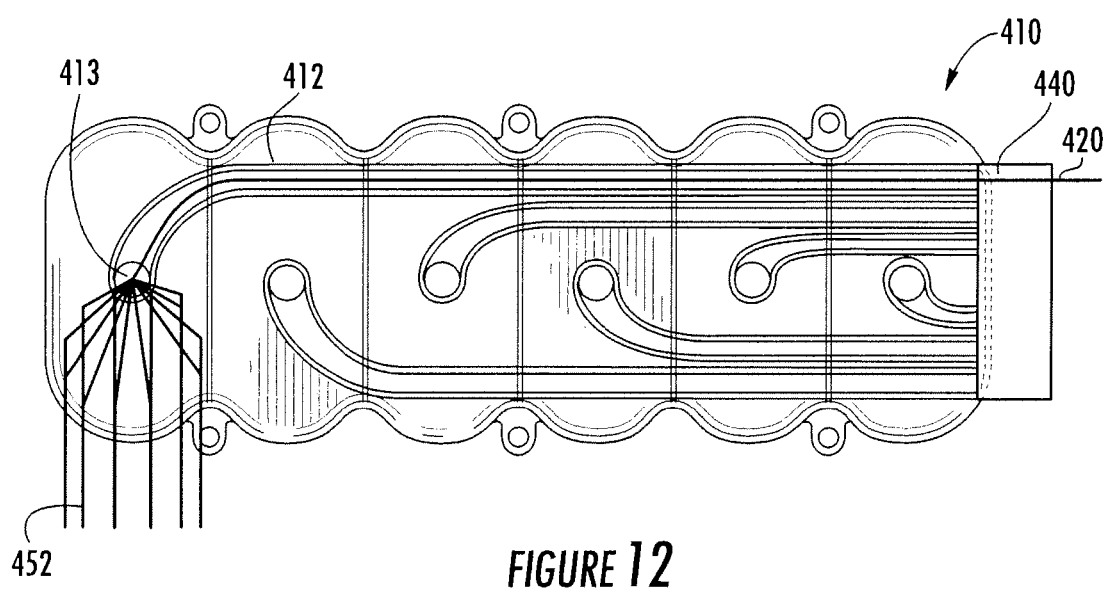
FIG. 12 is a top plan view of the battery module shown in FIG. 10 showing a fluid flow path for the module.

As shown in FIG. 10, a cover 402 is provided above the manifold 410 to provide a cover for cooling channels (e.g., channel 412 shown in FIG. 11), for example, to pneumatically seal the channels. The fluid (e.g., air) flow is represented by lines 420, 452, and 453 shown in FIGS. 10-14. The fluid is directed through the channels (e.g., channel 412) from a source located away from the module (e.g., external to the module) and routed toward one of the cells of the module. At the end 413 of channel 412, the fluid is directed toward the cell. According to an exemplary embodiment shown in FIGS. 10-14, the air then (shown in line 452) passes downward along the battery (e.g., across the terminals and down along the housing of the cell), after which it is exhausted at a base 430 of module 400 (shown by line 453). For purposes of illustration, the fluid flow is shown in all of FIGS. 10-14 to illustrate the flow of air with respect to the various components according to an exemplary embodiment.

While FIGS. 10-14 illustrate a manifold system in which only six channels are provided (e.g., airflow is shared between two adjacent cells), according to other exemplary embodiments, a system may be provided that routes airflow to each individual cell (e.g., twelve channels for twelve cells) or which routes air to a different number of cells.

The inlet 440 allows air to be drawn into the manifold from the appropriate source. The system involves cooling individual battery cells by drawing cool air from a source, passing the air across the exposed ends of the battery terminals, and exhausting the air outside of the vehicle. The source of the air may be from the vehicle cabin, thereby using the same HVAC system as the cabin, a separate and independent HVAC system, or any other suitable source of cool air. An independent HVAC system would require independent hardware, controls, power, etc.

As shown in FIGS. 10-14, from an inlet 440, the fluid (e.g., air) would be routed over the battery terminals to cool the terminals. In order to maximize the cooling effect, the air would be passed over the individual battery cells in a parallel fashion, meaning that cool air would pass across only one or two sets of terminals (e.g., one cell) prior to being exhausted. This eliminates the problem of passing cool air across a number of sets of terminals in series, where the air is heated as it passes through the terminals and therefore has less of a cooling effect on the cells later in the cooling line.

Figure 13:
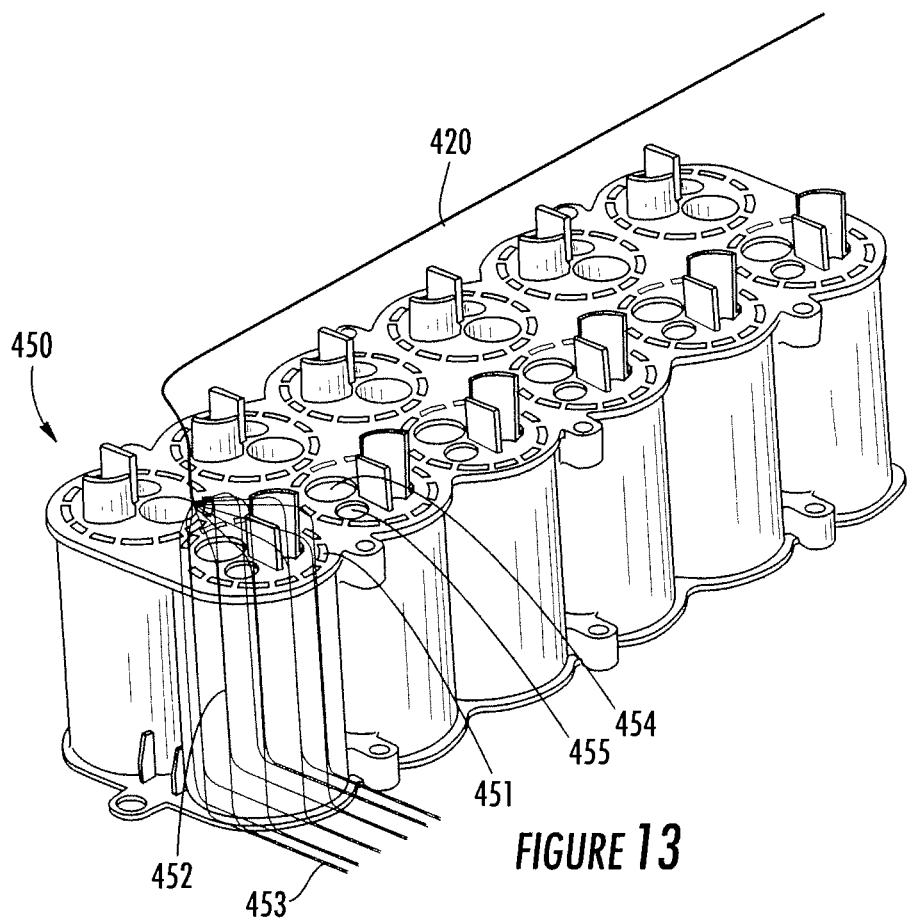
FIG. 13 is a perspective view of a portion of the battery module shown in FIG. 10 showing a fluid flow path for the module.

According to an exemplary embodiment shown in FIG. 13, the cooling fluid (e.g., air) is distributed evenly around the external surface of the battery cell. The housing 450 that envelops the battery cells has apertures 451 through which the fluid 420 flows (the housing 450 includes ribs that abut an external surface of the cells to define channels for fluid flow adjacent the cells and aligned with the apertures 451). The fluid is drawn or pushed from the top of the cell and allowed to flow evenly through the apertures 451. The apertures 451 are evenly distributed around the perimeter of the battery cell to facilitate equal cooling. This is shown in FIG. 13 by the individual fluid lines 452 and 453 through the apertures 451. An equal portion of the fluid 420 flows through each aperture 451 thereby evenly cooling the circumference of each battery cell. Apertures 454 and 455 are provided in the housing 450 to house the terminals (e.g., terminals 134 and 136 from FIG. 1) of the battery cell.

Figure 14:
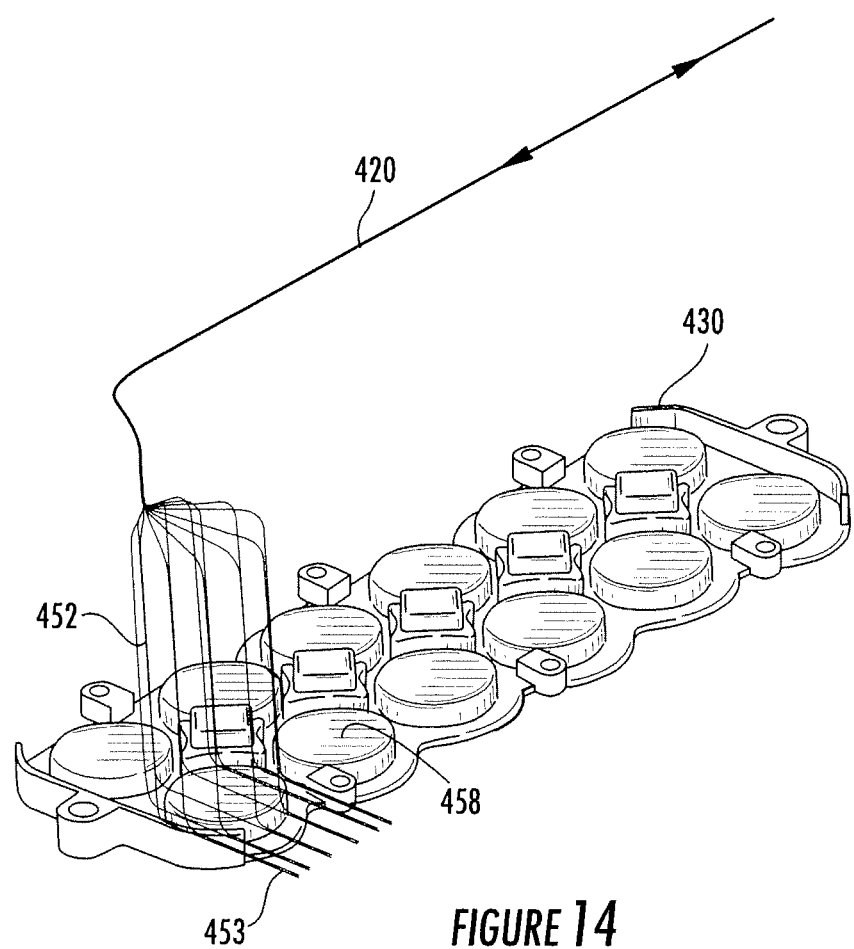
FIG. 14 is a perspective view of a portion of the battery module shown in FIG. 10 showing a fluid flow path for the module.

FIG. 14 shows the exhaustion of the cooling fluid over the base 430. After the fluid 420 (e.g., air) flows over the battery (line 452) cooling it, it is expelled (line 453) over each battery's base 458.

Although the description for FIG. 10-14 describes the flow of cooling fluid into the battery from the inlet 440, the same cooling process would be effective via a pulling mechanism. For example, cooling fluid (e.g., air) may be pulled through the battery towards inlet 440. The fluid would flow in the opposite direction, line 453 to line 452 to line 420 and have the same parallel cooling effect.

According to an exemplary embodiment, one or more fans may be provided to push or pull the air through the various channels.

FIGS. 15-19 illustrate a battery module 500 according to another exemplary embodiment configured for parallel cooling of the battery cells. A cooling fluid (e.g., air), passes over at least a portion of the cells of the module in parallel fashion. In other words, the cooling fluid is routed such that it does not pass over all cells of the battery (which would accumulate heat as the air passed from one cell to the next), but rather, is instead routed such that it passes over only one or two of the cells. The cooling fluid enters apertures 574 (FIG. 17) in the bottom cover 570 of the module, and flows upward through the individual battery cells. Since the battery cells have separate apertures 551 through which the cooling fluid flows, the cooling fluid only cools one battery cell before it is expelled out of the top of the manifold assembly 502.

Figure 19:
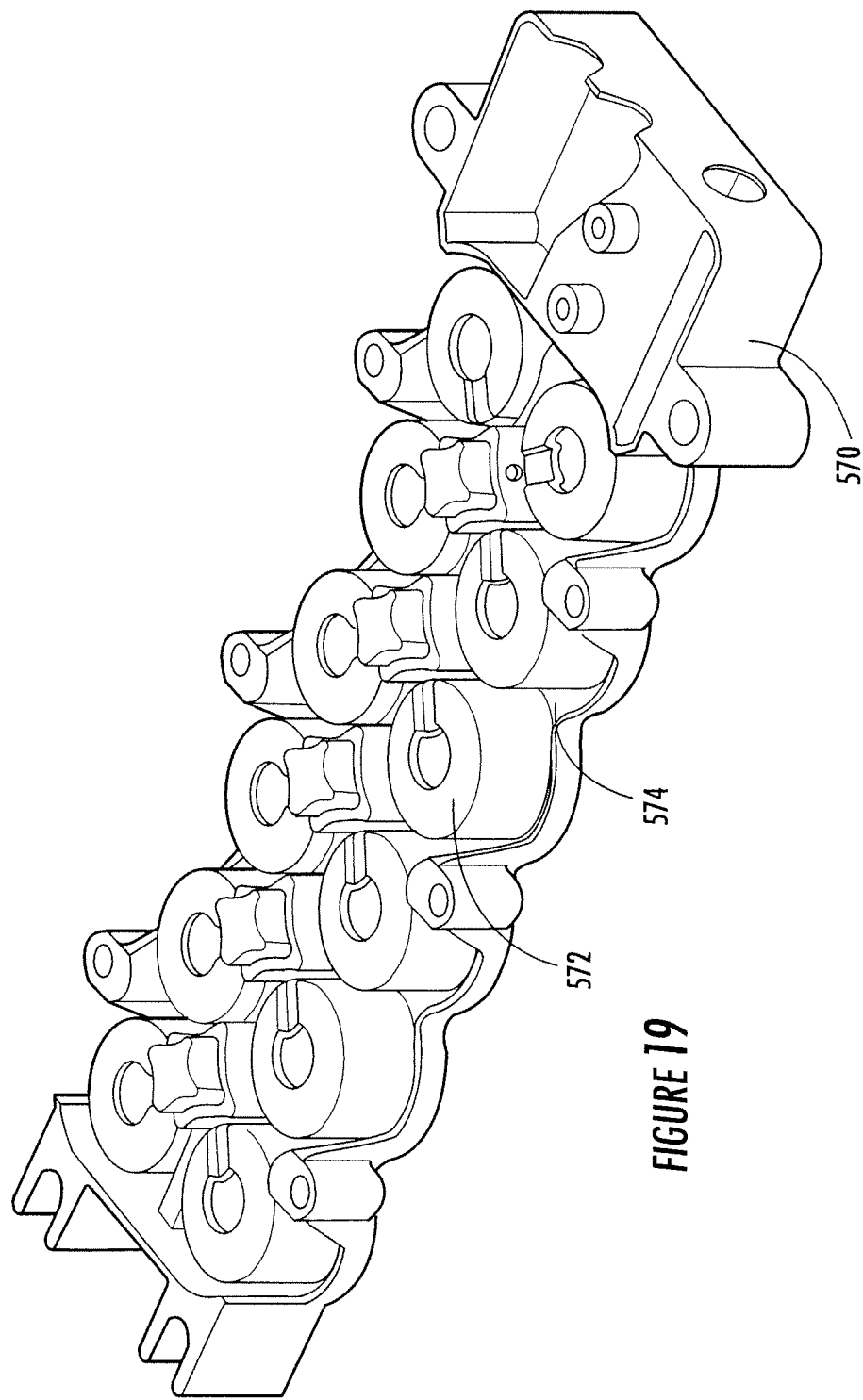
FIG. 19 is a bottom plan view of a portion of the battery module shown in FIG. 18.

FIG. 19 shows the bottom cover 570 of the battery module 500. The individual battery cells rest on bases 572 and cooling fluid is drawn in through apertures 574. By pulling cooling fluid (e.g., air) through apertures 574 evenly, an equal amount of cooling fluid can be provided to each individual battery cell.

Figure 17:
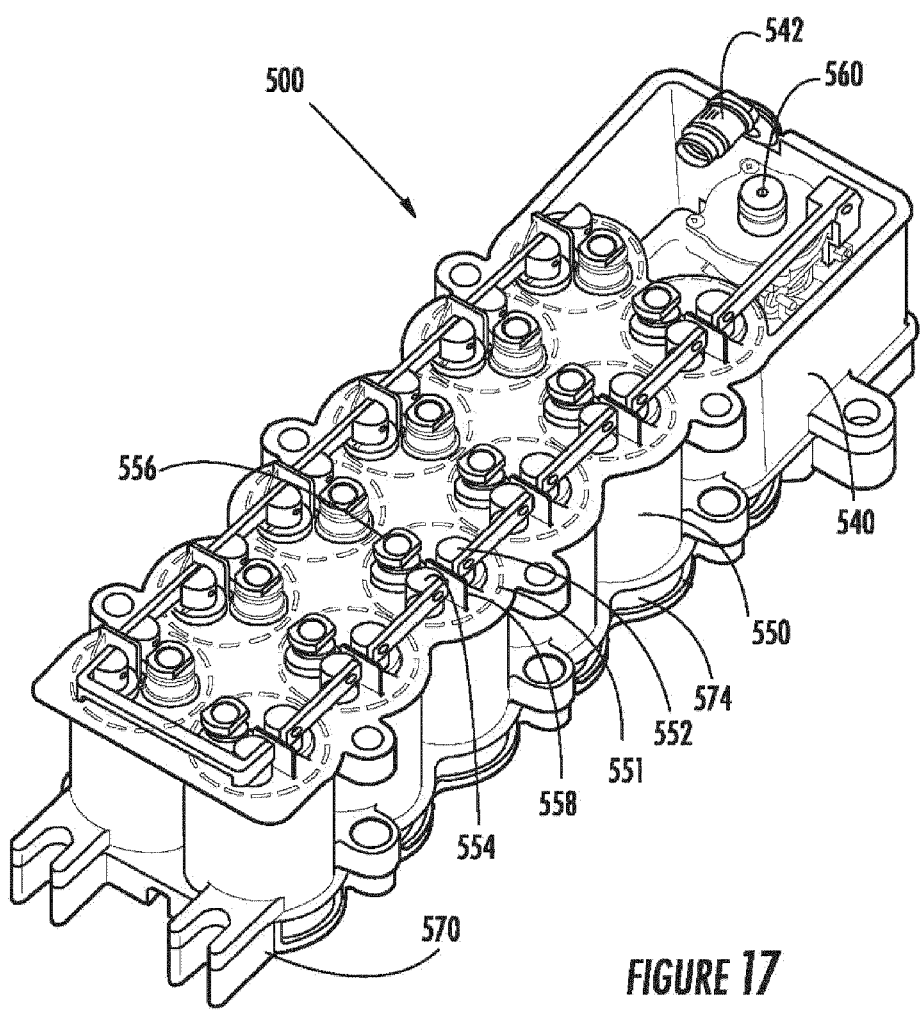
FIG. 17 is a perspective view of a portion of a battery module according to another exemplary embodiment configured to utilize the manifold shown in FIG. 15.
Figure 18:
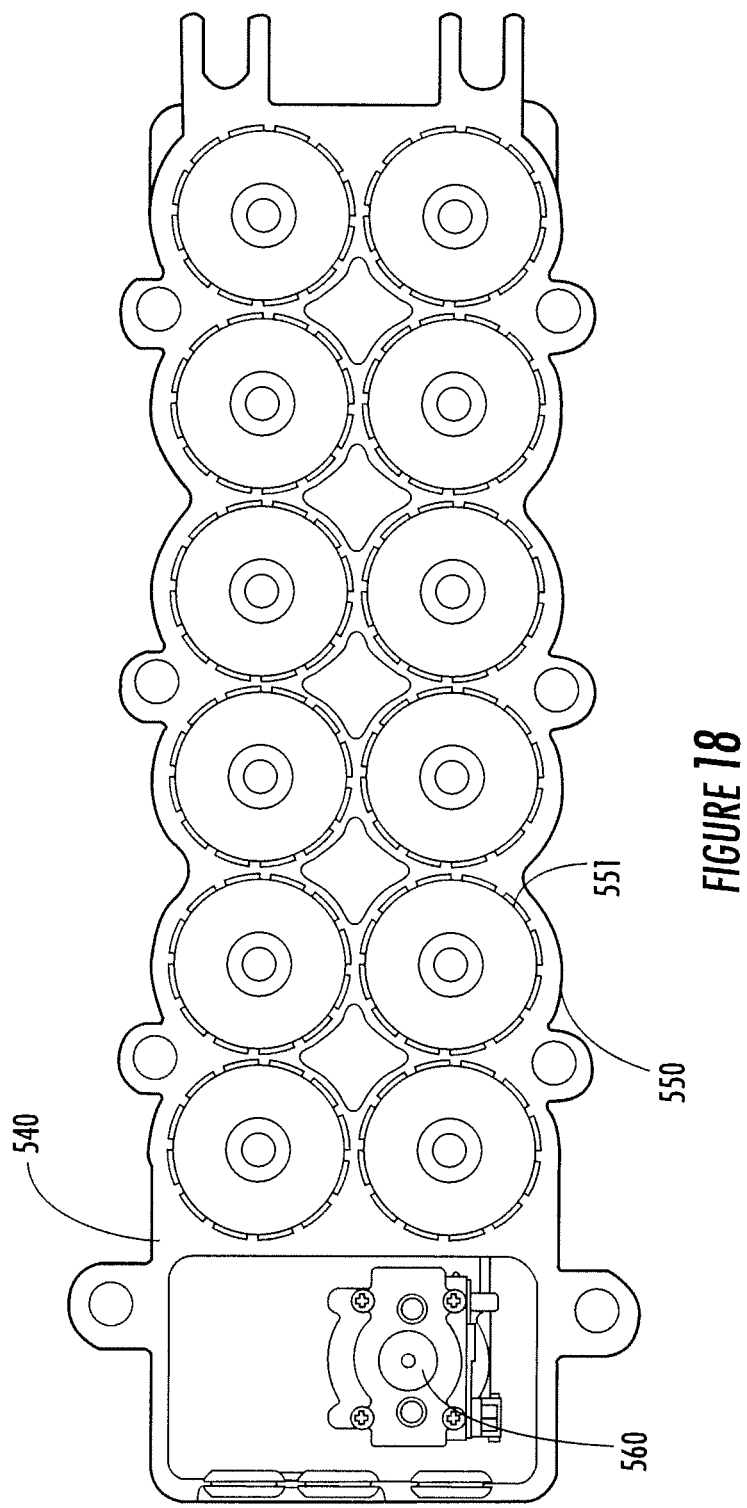
FIG. 18 is a bottom plan view of a portion of a battery module according to another exemplary embodiment configured to utilize the portion shown in FIG. 17 and the manifold shown in FIG. 15.

According to an exemplary embodiment, FIG. 17 shows a battery cell housing 540 designed for parallel cooling. The bottom cover 570 contains apertures 574 for drawing cooling fluid (e.g., air) into the battery cells. The cooling fluid can be pushed or pulled into the apertures 574. The individual battery cell containers 550 contain apertures 551 located equidistantly around the battery cell circumference for equal flow of the cooling fluid (e.g., air). Because the apertures 551 are spaced equidistantly around the perimeter of the battery cell, an equal amount of cooling fluid cools the entire circumference of the battery cell. FIG. 18 shows a bottom view of the battery cell housing 540 that shows the equidistant layout of the apertures 551 around the entire circumference of the battery cell container 550. Fluid (e.g., air) is drawn into the apertures 574 of the bottom cover 570 and cools the individual battery cells by flowing upwards through apertures 551 of the individual battery cell containers 550. As the cooling fluid (e.g., air) flows upward through the apertures 551, it draws heat off of the battery cell. Because each battery cell has its own apertures 551 for cooling fluid, the batteries are cooled in parallel and the cooling fluid only draws heat off one battery as it passes.

FIG. 17 shows that the individual battery cell containers 550 include apertures for the terminals 552 and 554 and vent 556 of the battery cells. The fin 558 is included to insulate the oppositely charged terminals 552 and 554 from each other. The pressure switch 560 measures pressure in the battery module 500 and removes the module from the power system of the vehicle if the pressure increases above a certain threshold.

Figure 15:
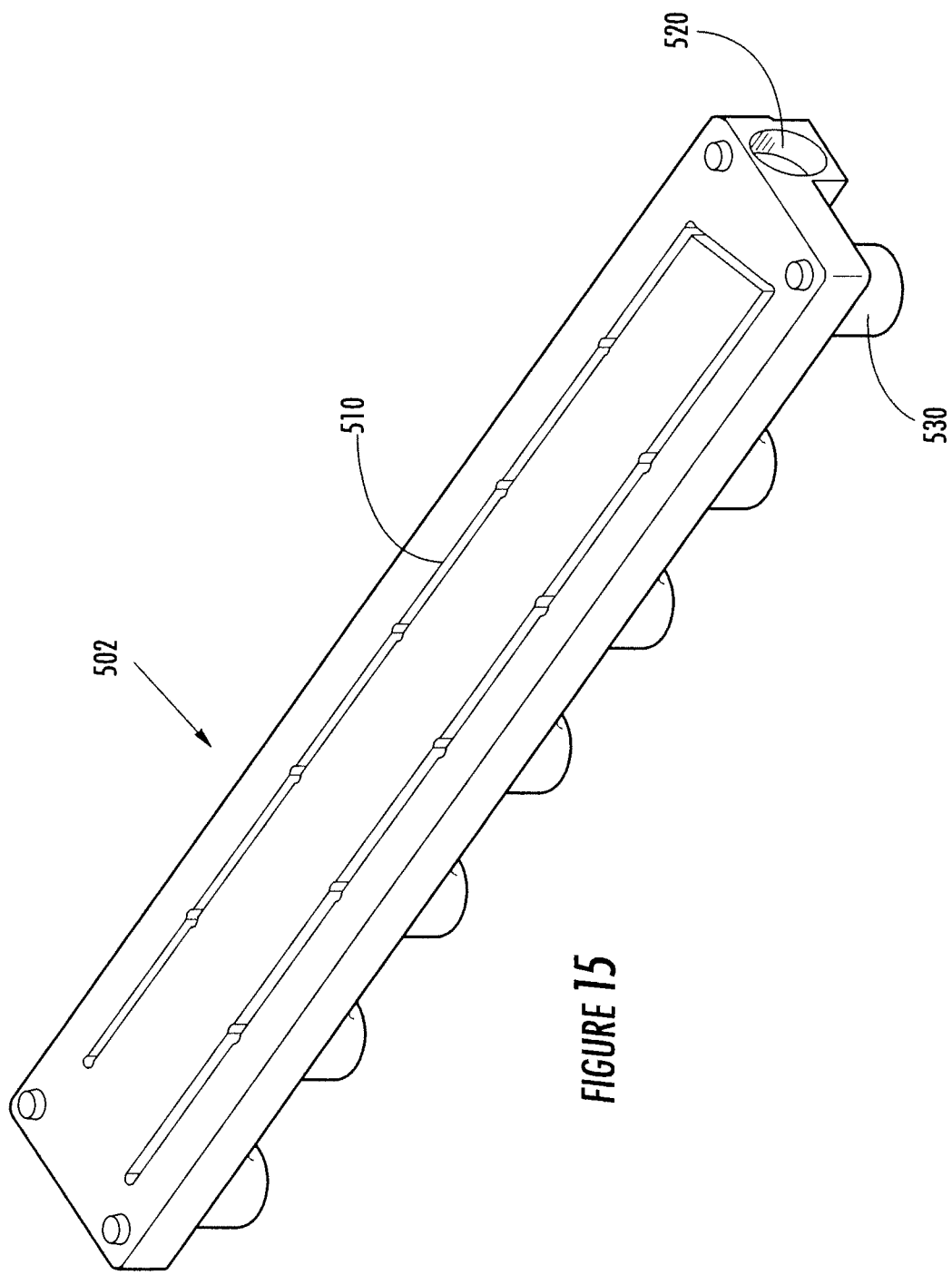
FIG. 15 is a perspective view of a manifold for a battery module according to another exemplary embodiment.
Figure 16:
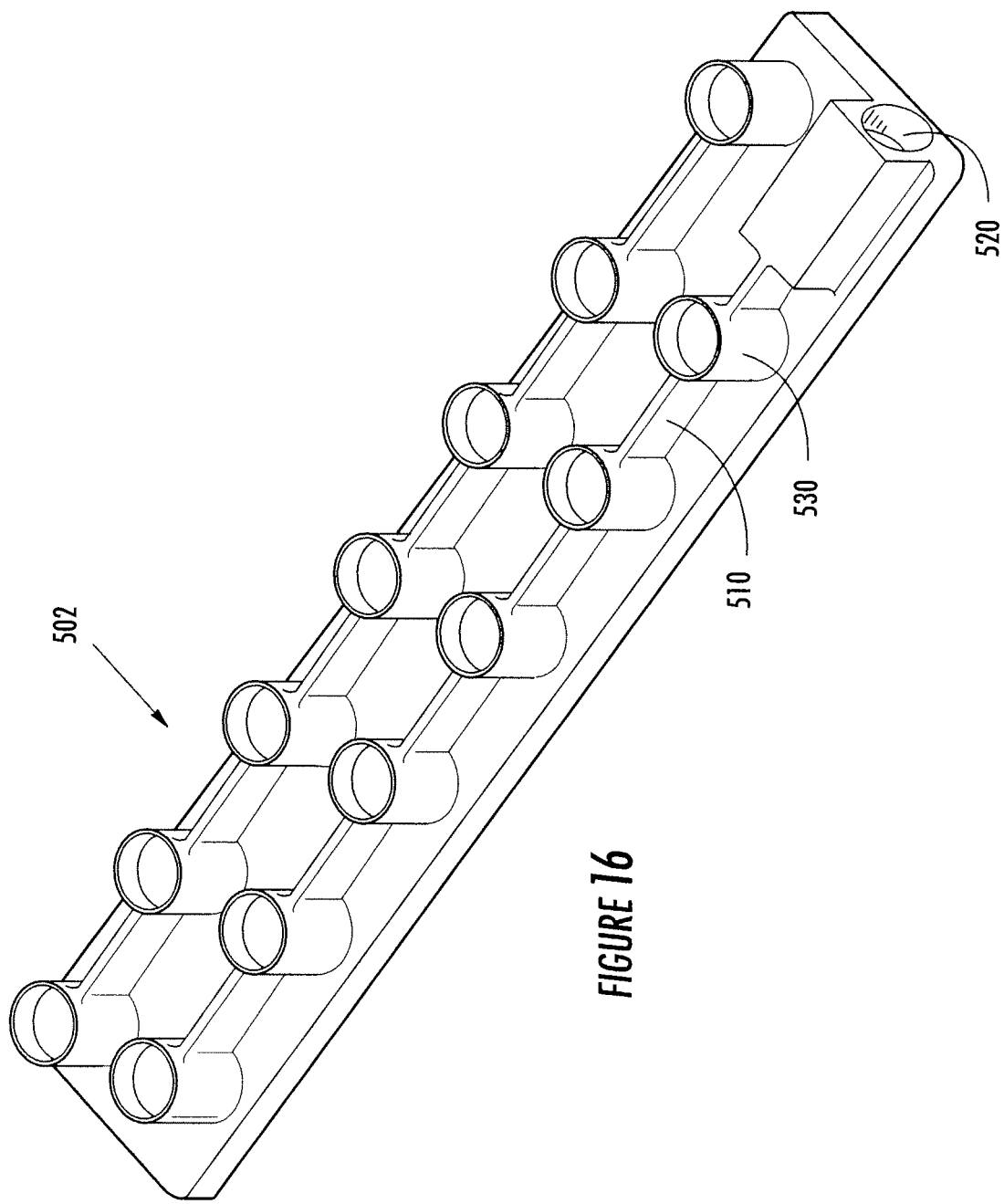
FIG. 16 is another perspective view of the manifold shown in FIG. 15 according to an exemplary embodiment.

FIGS. 15 and 16 show a manifold assembly 502 that is located above the battery cell container 550. When the cooling fluid (e.g., air) exits the apertures 551 (FIG. 17), it flows into the cell nozzle 530 of the manifold assembly. The manifold assembly 502 is constructed so that there is one cell nozzle 530 per battery cell of the module 500. After the fluid exits the cell nozzle 530, it then flows into the common channel 510. A cover which is not pictured pneumatically seals the manifold assembly 502. The fluid then flows upwards from the common channel through apertures in the cover (not pictured) of the manifold assembly 502. A fan (not pictured) then pulls or pushes the cooling fluid out of the module 500.

A system burst plug 542 shown in FIG. 17 is contained in aperture 520 of the manifold assembly 502. The burst plug 542 releases pressure from the module 500 if the gas pressure exceeds a certain threshold.

Although FIGS. 15-19 illustrate a battery module 500 configured for pulling cooling fluid upwards, the cooling process would also be effective if fluid was pushed downwards, starting at the manifold assembly 502. The same parallel cooling effects would apply and are within the scope of this disclosure.

To accommodate different configurations of battery modules, according to other exemplary embodiments, the inlet and exhaust locations may be located at a variety of locations around the perimeter of the manifold or at other locations within the module. Additionally, the cooling system may be mounted to one or both ends of a battery module. Additional configurations are possible, and depend upon the desired operating characteristics of each system.

It should also be noted that according to other exemplary embodiments, a different configuration may be used for the manifold system. For example, according to an exemplary embodiment, a main fluid supply channel may be provided within the manifold (e.g., a single channel running along the middle of the manifold or one or more channels running along the sides of the manifold). Apertures or openings may be provided in the supply channel(s) that would allow air to flow across the various cells in parallel fashion. Again, one or more fans may be provided to push or pull the air through the channel(s).

Figure 20:
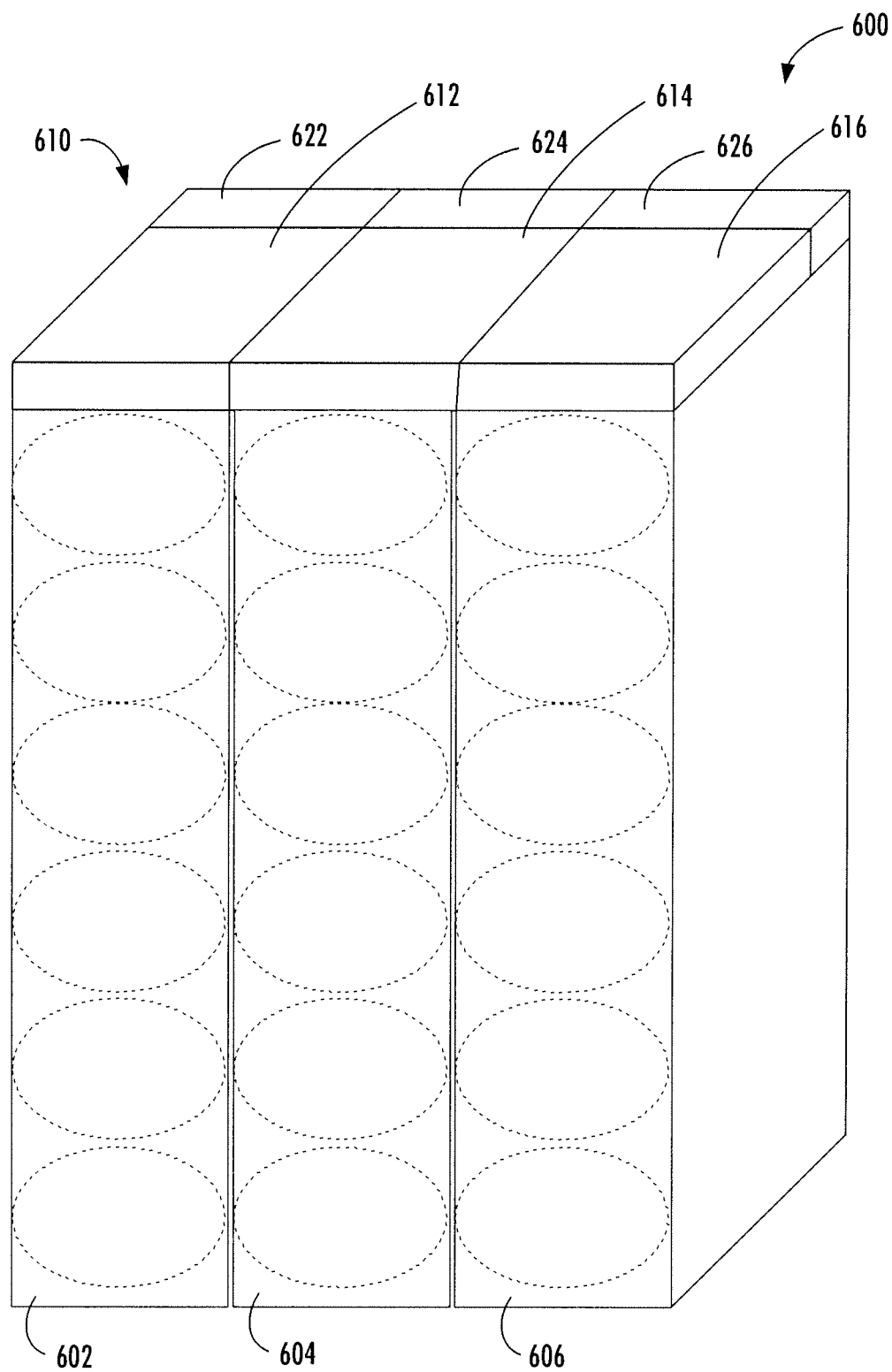
FIG. 20 is a schematic view of a battery system including a plurality of battery modules and a system for collecting gases according to an exemplary embodiment.

FIG. 20 is a schematic view of a battery system 600 including a plurality of battery modules 602, 604, and 606 (e.g., similar to that shown in FIG. 1 or in any other known system or system that may be developed in the future) and a system for collecting gases according to an exemplary embodiment. Each module 602, 604, and 606 as shown in FIG. 20 includes six cells (shown as dashed line ovals), although the number of cells may differ according to various other exemplary embodiments.

According to an exemplary embodiment, a system 610 for handling gaseous emissions from battery cells is provided. As shown in FIG. 20, system 610 is provided on a side surface (e.g., at one of the shorter sides of each of the modules) of the battery system according to an exemplary embodiment. According to other exemplary embodiments, the system may be provided at another location.

Proper handling of gases may be desirable to control the exhaust of potentially toxic gases and to control and manage potential pressure build-ups due to gaseous emissions from the cells. The system 610, as shown in FIG. 20, involves capturing the gaseous emissions from the individual battery cells, properly processing the gases while still within the vehicle, and then allowing for safe exhaust of the gases.

System 610 includes a pneumatically sealed device that is provided at the end of the battery system 600. Each module 602, 604, and 606 includes a plurality of chambers provided adjacent thereto. For example, module 602 has chambers 612 and 622 provided adjacent thereto; module 604 has chambers 614 and 624 provided adjacent thereto; and module 606 has chambers 616 and 626 provided adjacent thereto.

Chambers 612, 614, and 616 are in fluid communication with the cells included in their respective modules. For example, where a module includes a channel or passage for directing effluent expelled from its cells, the channel or passage may be in fluid communication with the chamber (e.g., chambers 612, 614, or 616). Such chambers may include a dryer material for removing potentially harmful materials from the effluent stream.

After traveling through chambers 612, 614, and 616, the effluent may be routed into chambers 622, 624, and 626, respectively, where the gases may be collected. Such chambers may be referred to as condensate reservoirs. Chambers 622, 624, and 626 may include a valve (not shown) that would allow gases to be released to a common area. The common area would again be fitted with a valve that would control the release of gases to be exhausted from the vehicle.

As shown in FIG. 20, each of the modules may include an independent reservoir for gas collection. The valve would be configured so as to release gases once a certain pressure level inside of the reservoir has been reached, thus reducing the occurrence pressure build-ups within the battery pack area. Also, the emissions of individual modules may be monitored so as to enable the system to shut down any modules that are consistently emitting excess gases.

Once released from the reservoir, the gas would travel to the common area, which could be mounted adjacent to the modules or in any other appropriate position. The common area would collect the gases released from all of the independent module reservoirs. The common area would also have a valve configured to release gases for exhaust once a certain pressure level inside of the common area is reached.

Once released from the common area, the gases would then be routed so as to safely be exhausted from the vehicle. Depending on the exact characteristics desired, the configuration of the overall system and the subcomponents may vary.

It should be noted that while FIG. 20 illustrates an embodiment in which separate chambers are provided for each of the individual modules, according to other exemplary embodiments, the modules may share chambers (e.g., one dryer chamber and one condensate reservoir may be provided for the entire battery system, such that the various modules share the dryer chamber and condensate reservoir).

The aforementioned description refers primarily to use of the modules and system in conjunction with Lithium battery cells. However, the aforementioned embodiments and inventions are configured for use with cells that may be nickel-metal hydride type batteries, lithium-ion batteries, lithium polymer batteries, or other types of batteries now known or which may be developed in the future. The present invention is not limited to Lithium type batteries.

It is important to note that the construction and arrangement of the system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied (e.g., the variable temperature resistor may be provided adjacent a negative terminal of a battery), and the nature or number of discrete elements or positions may be altered or varied (e.g., a plurality of resistors may be provided in place of a single resistor). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

What is claimed is:

1. A battery module comprising:
a plurality of battery cells located in a housing; and
a system configured for conveying a fluid past at least a portion of the cells in a parallel manner from a first end of each of the cells to a second end of each of the cells opposite the first end;
wherein each of the cells is located in an individual cell container of the housing, each cell container including a plurality of apertures positioned above the cell located therein and configured to direct the fluid through the associated cell container so that the fluid is evenly distributed about a perimeter of the cell, wherein the system is configured such that fluid flowing past each individual cell is directly exhausted from the battery module after passing the second end of each individual cell.

2. The battery module of claim 1, wherein the fluid comprises air.

3. The battery module of claim 1, wherein the system includes a manifold for distributing the fluid.

4. The battery module of claim 3, wherein the fluid is forced from the manifold past the plurality of battery cells.

5. The battery module of claim 3, wherein the fluid is pulled into the manifold after passing the plurality of battery cells.

6. The battery module of claim 3, wherein the manifold includes at least one channel, wherein each channel includes at least one end for distributing the fluid toward at least one of the plurality of cells.

7. The battery module of claim 1, wherein the apertures are distributed evenly about the perimeter of each of the cells.

8. The battery module of claim 1, wherein the module includes twelve battery cells.

9. The battery module of claim 1, wherein each of the plurality of battery cells includes a plurality of positive terminals and a plurality of negative terminals.

10. The battery module of claim 9, wherein the terminals of each of the plurality of battery cells are configured for coupling to a terminal of another battery cell.

11. The battery module of claim 1, wherein each of the cells has a generally oval cross-sectional shape.

12. The battery module of claim 1, wherein each of the cells includes a vent for releasing gas from within the cells.

13. The battery module of claim 1, wherein the plurality of battery cells are electrically coupled together with buss bars, the buss bars coupling a positive terminal of a first one of the cells to a negative terminal of a second one of the battery cells.

14. The battery module of claim 1, wherein the cells are arranged so that a positive terminal of each of the cells is adjacent a negative terminal of an adjacent one of the cells.

15. The battery module of claim 1, wherein the module is configured for use in a vehicle.

16. The battery module of claim 1, wherein the module is configured to be operatively connected to a plurality of other battery modules to form a battery system.

17. The battery module of claim 16, wherein the fluid system supplies fluid to both the module and other modules.

18. A battery module comprising:
a plurality of battery cells located in a housing; and
a system configured for conveying fluid past at least a portion of the cells in a parallel manner from a first end of each of the cells to a second end of each of the cells opposite the first end;
wherein a manifold is located in the housing to distribute fluid evenly from a common inlet to the cells and wherein each of the cells is located in an individual cell container of the housing, each cell container including a plurality of apertures configured to direct the fluid through the associated cell container so that the fluid is evenly distributed about a perimeter of the cell, wherein the system is configured such that fluid flowing past each individual cell is directly exhausted from the battery module after passing the second end of each individual cell.

19. A battery module comprising:
a plurality of battery cells; and
a system configured for passing a fluid past the plurality of battery cells in a parallel manner from a first end of each of the plurality of battery cells to a second end of each of the plurality of battery cells opposite the first end, wherein the system includes a manifold comprising a plurality of discrete channels, each channel extending from a common inlet of the system to a subset of the plurality of battery cells, wherein the system is configured such that fluid flowing past each individual cell is directly exhausted from the battery module after passing the second end of each individual cell.

20. The battery module of claim 19, wherein the battery module comprises a housing for the plurality of battery cells.

21. The battery module of claim 20, wherein each of the plurality of containers comprises a plurality of apertures through which the fluid may flow and in fluid communication with one of the channels for routing the fluid evenly distributed about a perimeter of the battery cell.

* * * * *